United States Patent
Nishiyama et al.

(10) Patent No.: US 6,609,729 B2
(45) Date of Patent: Aug. 26, 2003

(54) RESIN HOSE CONNECTION METHOD AND RESIN HOSE CONNECTION STRUCTURE PRODUCED BY EMPLOYING THE METHOD

(75) Inventors: Takahiro Nishiyama, Aichi-ken (JP); Kouyou Fujimori, Gifu-ken (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 09/866,659

(22) Filed: May 30, 2001

(65) Prior Publication Data

US 2002/0008385 A1 Jan. 24, 2002

(30) Foreign Application Priority Data

May 30, 2000 (JP) .......................... 2000-160961

(51) Int. Cl.[7] .................. F16L 11/04; B29D 23/00
(52) U.S. Cl. .................. 285/94; 285/256; 285/423; 29/890.144
(58) Field of Search .................. 285/94, 55, 256, 285/423, 260, 222.1–222.5; 29/890.144

(56) References Cited

U.S. PATENT DOCUMENTS

| | | | | |
|---|---|---|---|---|
| 2,315,225 A | * | 3/1943 | Rogers .................. 285/239 |
| 3,951,438 A | * | 4/1976 | Scales .................. 285/247 |
| 4,500,577 A | * | 2/1985 | Satake et al. .................. 138/143 |
| 4,611,832 A | * | 9/1986 | Matsuoka et al. ... 118/DIG. 11 |
| 5,090,745 A | * | 2/1992 | Kluger .................. 285/187 |
| 5,359,148 A | * | 10/1994 | Okase et al. .................. 118/715 |
| 5,957,163 A | * | 9/1999 | Ito et al. .................. 138/109 |
| 6,164,704 A | * | 12/2000 | Sausner .................. 285/222.1 |
| 6,234,543 B1 | * | 5/2001 | Logan et al. .................. 285/256 |

FOREIGN PATENT DOCUMENTS

| | | |
|---|---|---|
| JP | 57-025292 | 9/1982 |
| JP | 60-212235 | * 2/1985 |
| JP | 08-216278 | 9/1996 |
| JP | 08-252873 | 10/1996 |
| JP | 09-100959 | 4/1997 |
| JP | 09-144955 | 6/1997 |
| WO | WO 97/21053 | 6/1997 |

* cited by examiner

Primary Examiner—Eric K. Nicholson
(74) Attorney, Agent, or Firm—Armstrong, Westerman & Hattori, LLP

(57) ABSTRACT

A method of connecting a resin hose to a metal pipe comprising the steps of: forming a fluororubber coating layer on an inner peripheral surface of the resin hose; forming a lubricating layer of a fluorine-containing lubricant on an inner peripheral surface of the fluororubber coating layer; and inserting an end portion of the metal pipe into an end portion of the resin hose formed with the lubricating layer. Fluorine atoms in a fluororubber molecular skeleton are hydrogen-bonded to hydroxyl groups introduced in a metal of the metal pipe and therefore the adhesion between the resin hose and the metal pipe is enhanced for improvement of the sealing property. Further, the lubricating layer facilitates the insertion of the metal pipe into the resin hose for the connection therebetween.

11 Claims, 2 Drawing Sheets

RESIN HOSE CONNECTION METHOD AND RESIN HOSE CONNECTION STRUCTURE PRODUCED BY EMPLOYING THE METHOD

BACKGROUND OF THE INVENTION

1. Field of the Invention

The present invention relates to a resin hose connection method and a resin hose connection structure produced by employing the method.

2. Description of the Art

Conventionally, a hose to be connected to a metal pipe such as of a pressure regulator or a fuel strainer of an automobile is composed of a highly elastic rubber. Recently, an attempt has been made to suppress gasoline permeation and to achieve weight reduction and cost reduction by employing a resin hose instead of the conventional rubber hose.

However, the resin hose has a lower elasticity than the rubber hose, so that insertion of the metal pipe into the hose is less easy and the sealing property of the hose with respect to the metal pipe is inferior.

In view of the foregoing, it is an object of the present invention to provide a resin hose connection method and a resin hose connection structure produced by the method, which ensure easy insertion of the metal pipe into the hose and an excellent sealing property.

SUMMARY OF THE INVENTION

In accordance with a first aspect of the present invention to achieve the aforesaid object, there is provided a method of connecting a resin hose to a metal pipe, the method comprising the steps of: forming a fluororubber coating layer on an inner peripheral surface of the resin hose; forming a lubricating layer of a fluorine-containing lubricant on an inner peripheral surface of the fluororubber coating layer; and inserting an end portion of the metal pipe into an end portion of the resin hose formed with the lubricating layer.

In accordance with a second aspect of the present invention, there is provided a resin hose connection structure comprising: a resin hose; a fluororubber coating layer provided on an inner peripheral surface of the resin hose; a metal pipe inserted in the resin hose; and a trace of a fluorine-containing lubricant present in an interface between the fluororubber coating layer and the metal pipe, the fluorine-containing lubricant having been present as a lubricating layer between the fluororubber coating layer and the metal pipe at insertion of the metal pipe into the resin hose and finally diffused in the fluororubber coating layer.

The inventors of the present invention have conducted intensive studies on a resin hose connection method which ensures easy insertion and an excellent sealing property. In the course of the studies, the inventors found that, where a fluororubber coating layer is formed on an inner peripheral surface of the resin hose, fluorine atoms in a fluororubber molecular skeleton are hydrogen-bonded to hydroxyl groups of a metal of a metal pipe to enhance adhesion between the resin hose and the metal pipe for improvement of the sealing property. However, insertion of the metal pipe into the hose cannot be facilitated simply by forming the fluororubber coating layer on the inner peripheral surface of the resin hose. The inventors have come up with an idea of additionally forming a lubricating layer on an inner peripheral surface of the fluororubber coating layer for easier insertion of the metal pipe. Where dimethyl silicone or the like is employed as the lubricant, however, the fluororubber coating layer is separated from the hose when the lubricant is applied on the fluororubber coating layer. Therefore, the adhesion between the fluororubber coating layer and the resin hose is deteriorated, so that the easy insertion and the sealing property cannot simultaneously be ensured. Further research and development conducted by the inventors have revealed that, where a fluorine-containing lubricant is employed as the lubricant, the fluororubber coating layer is not separated when the lubricant is applied on the inner peripheral surface of the fluororubber coating layer, so that the easy insertion and the sealing property can simultaneously be ensured without the deterioration of the adhesion between the fluororubber coating layer and the resin hose. Further, it has been found that the lubricating layer of the fluorine-containing lubricant facilitates the insertion of the metal pipe when the hose is connected to the metal pipe and, after the connection, the fluorine-containing lubricant penetrates into the fluororubber coating layer formed on the inner peripheral surface of the resin hose so that the lubricating layer disappears. Therefore, hydrogen bonds are sufficiently formed in the interface between the metal pipe and the fluororubber coating layer on the inner peripheral surface of the resin hose. Thus, the present invention has been attained.

DETAILED DESCRIPTION OF THE INVENTION

Figure 1:
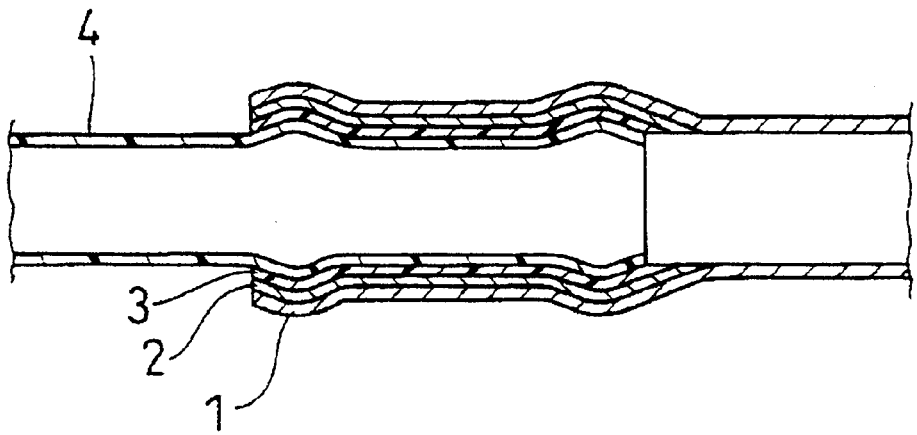
FIG. 1 is a sectional view illustrating an exemplary resin hose connection structure with a lubricating layer in accordance with the present invention.

The present invention will hereinafter be described in detail by way of embodiments thereof.

In a resin hose connection method according to the present invention, a fluororubber coating layer is first formed on an inner peripheral surface of a resin hose, and then a lubricating layer of a fluorine-containing lubricant is formed on an inner peripheral surface of the fluororubber coating layer. Thereafter, an end portion of a metal pipe is inserted into an end portion of the resin hose formed with the lubricating layer. By thus connecting the resin hose to the metal pipe, the insertion of the metal pipe into the hose is facilitated, and the sealing property of the resin hose is improved.

The resin hose to be used in the present invention may be of a single layer structure consisting of a single resin layer or of a multi-layer structure consisting of a plurality of resin layers, and the structure thereof is not particularly limited. Exemplary materials for the resin hose are a fluorine-containing resin, a polyamide resin and a polyester resin.

Examples of the fluorine-containing resin include polyvinylidene fluoride (PVDF), polychlorotrifluoroethylene (CTFE), copolymers of ethylene and chlorotrifluoroethylene (ECTFE), copolymers of ethylene and tetrafluoroethylene (ETFE), copolymers of hexafluoropropylene and tetrafluoroethylene (FEP), fluoroalkoxyethylene resins (PFA), and polytetrafluoroethylene (PTFE).

The polyamide resin is not limited to aliphatic polyamides and aromatic polyamides, and examples thereof include polymers of a lactam, condensates of a diamine and a dicarboxylic acid, polymers of an amino acid, and copolymers and blends of any of these compounds. Specific examples of the polyamide resin include nylon 6, nylon 11, nylon 12, nylon 610, nylon 612, and blends of nylon 11 or nylon 12 and nylon 666.

The polyester resin is formed by a known method, for example, through condensation polymerization of a polyvalent alcohol such as a diol and a polybasic acid such as a dicarboxylic acid. Examples of the diol include ethylene glycol, propylene glycol, 1,4-butanediol, neopentyl glycol, cyclohexanediol, xylylene glycol, hexahydroxylylene glycol and bis(4-β-hydroxyethoxyphenyl)sulfone. Examples of the dicarboxylic acid include aromatic dicarboxylic acids such as terephthalic acid, isophthalic acid, phthalic acid, 2,6-naphthalenedicarboxylic acid and 4,4-diphenyleneetherdicarboxylic acid, and aliphatic dicarboxylic acids such as malonic acid, succinic acid, glutaric acid, adipic acid, sebacic acid, undecanedioic acid, dodecanedioic acid, tridecanedioic acid, tetradecanedioic acid, hexadecanedioic acid, hexadecenedioic acid, octadecanedioic acid, octadecenedioic acid, eicosanedioic acid, eicosenedioic acid and 1,10-dodecane dicarboxylic acid. In particular, polybutylene terephthalate which is a condensation polymer of 1,4-butanediol and terephthalic acid is preferably used as the polyester resin.

The method for the formation of the fluororubber coating layer on the inner peripheral surface of the resin hose is not particularly limited. For example, a fluororubber coating solution is applied on the inner peripheral surface of the resin hose, and then heat-treated to evaporate a solvent contained in the coating solution for formation of a thin coating layer. Further heat treatment promotes vulcanization of the rubber to provide a firmer coating layer. The method for the application of the fluororubber coating solution is not particularly limited, but exemplary methods therefor include brush coating, spray coating and dipping.

The fluororubber coating layer preferably has a thickness of 1 to 200 μm, particularly preferably 10 to 50 μm. If the thickness of the fluororubber coating layer is smaller than 1 μm, the provision of the fluororubber coating layer is less effective, so that the adhesion to the metal pipe is reduced, making it difficult to provide a satisfactory sealing property. If the thickness of the fluororubber coating layer is greater than 200 μm, an insertion resistance is increased when the metal pipe is inserted into the hose, making it difficult to connect the hose to the metal pipe.

The fluorine-containing lubricant to be employed as a material for the lubricating layer is not particularly limited, but a lubricant mainly comprised of a polyfluorohaloolefin or a fluorine-modified silicone is preferably used as the fluorine-containing lubricant.

The fluorine-containing lubricant may be comprised of the polyfluorohaloolefin or the fluorine-modified silicone alone.

The polyfluorohaloolefin may be any of polyfluoroolefins with fluorine atoms thereof partly substituted by halogen atoms such as chlorine atoms (excluding fluorine atoms), and is not particularly limited. For example, a lower polymer of trifluorochloroethylene having a structural unit represented by the following general formula (1) is preferably employed.

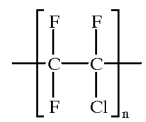

(1)

wherein n is a positive integer of 3 to 6.

The polyfluorohaloolefin is preferably a lower polymer having an average molecular weight of 500 to 1000, particularly preferably 900 to 1000. The polyfluorohaloolefin preferably has a viscosity of 50 to 1000 mm²/s, particularly preferably 100 to 300 mm²/s, at 25° C. If the average molecular weight or the viscosity of the polyfluorohaloolefin falls outside the aforesaid range, the polyfluorohaloolefin may have a poorer lubricating property and a lower penetrability into the fluororubber coating layer.

Examples of the fluorine-modified silicone include those having a structural unit represented by the following general formula (2) or (3). In particular, the fluorine-modified silicone having the structural unit represented by the general formula (2) is preferred because of its excellent lubricating property and higher penetrability into the fluororubber coating layer.

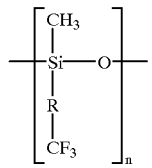

(2)

wherein R is an alkyl group, and n is a positive integer of 8 to 26.

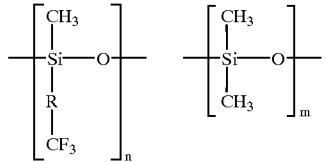

(3)

wherein R is an alkyl group, n is a positive integer of 4 to 26, and m is a positive integer of 4 to 26.

The fluorine-modified silicone preferably has an average molecular weight of 1200 to 4000, particularly preferably 1200 to 2500. Further, the fluorine-modified silicone preferably has a viscosity of 50 to 1000 mm²/s, particularly preferably 100 to 300 mm²/s, at 25° C. If the average molecular weight or the viscosity of the fluorine-modified silicone falls outside the aforesaid range, the fluorine-modified silicone may have a poorer lubricating property and a lower penetrability into the fluororubber coating layer.

The method for the formation of the lubricating layer of the fluorine-containing lubricant on the inner peripheral surface of the fluororubber coating layer is not particularly limited. The formation of the lubricating layer may be achieved, for example, by applying the fluorine-containing lubricant on an outer peripheral surface of a spindle, inserting the spindle into the resin hose formed with the fluororubber coating layer, and withdrawing the spindle. A lubricant application area on the inner peripheral surface of the fluororubber coating layer can be controlled by adjusting a lubricant application area on the outer peripheral surface of the spindle or the distance of the insertion of the spindle into the hose.

It is necessary to form the lubricating layer at least on a portion of the inner peripheral surface of the fluororubber coating layer at an end of the resin hose, because the metal pipe is connected to the end of the resin hose.

Next, an explanation will be given to a resin hose connection structure according to the present invention.

A resin hose connection structure according to the present invention is such that a lubricating layer of a fluorine-containing lubricant is present in an interface between a fluororubber coating layer of a resin hose and a metal pipe when the resin hose is connected to the metal pipe, and finally almost disappears from the interface. More specifically, the resin hose connection structure comprises a resin hose, a fluororubber coating layer provided on an inner peripheral surface of the resin hose, a metal pipe inserted in the resin hose, and a trace of a fluorine-containing lubricant present in an interface between the fluororubber coating layer and the metal pipe, the fluorine-containing lubricant having been present as a lubricating layer between the fluororubber coating layer and the metal pipe at insertion of the metal pipe into the resin hose and finally diffused in the fluororubber coating layer.

Figure 2:
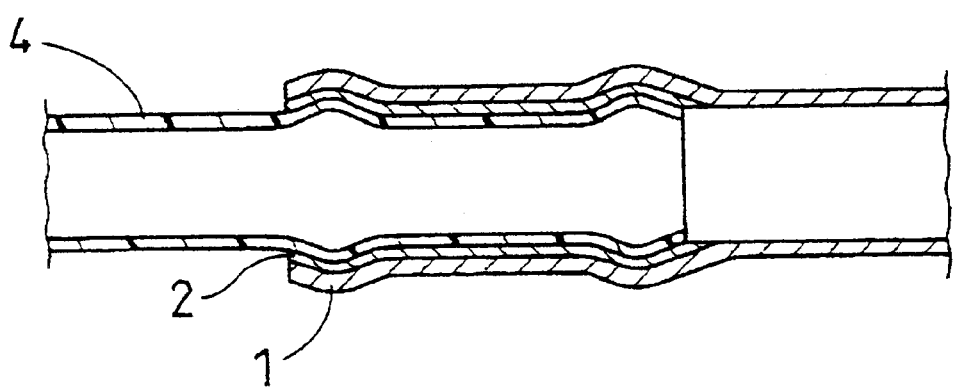
FIG. 2 is a sectional view illustrating the resin hose connection structure with the lubricating layer having disappeared in accordance with the present invention.

With reference to FIGS. 1 and 2, an explanation will be given to the resin hose connection structure of the invention. As shown in FIG. 1, a metal pipe 4 having nipples in an end portion thereof is fitted in an end portion of a resin hose 1 having a fluororubber coating layer 2 formed on an inner peripheral surface thereof for connection therebetween, and a lubricating layer 3 of a fluorine-containing lubricant is present in an interface between the fluororubber coating layer 2 and the metal pipe 4 at an initial stage. However, the lubricating layer 3 almost disappears as shown in FIG. 2 after a lapse of a predetermined period from the connection or when the resulting hose/pipe assembly is subjected to a heat treatment. Thus, the metal pipe 4 is firmly connected to the fluororubber coating layer 2 of the resin hose 1. In FIGS. 1 and 2, like components are denoted by like reference numerals.

As describe above, the lubricating layer 3 is present in the interface between the fluororubber coating layer 2 of the resin hose 1 and the metal pipe 4 when the resin hose 1 is connected to the metal pipe 4, but the lubricating layer 3 finally almost disappears. This is because the lubricating layer 3 is formed of the fluorine-containing lubricant which is mainly composed of a polyfluorohaloolefin or the like compatible with the fluororubber and penetrates into the fluororubber coating layer 2 with time. The presence of the lubricating layer 3 facilitates the insertion of the metal pipe 4 into the end portion of the resin hose 1 for the connection therebetween. After the connection, the fluorine-containing lubricant penetrates into the fluororubber coating layer 2 of the resin hose 1, so that the lubricating layer 3 almost disappears from the interface between the fluororubber coating layer 2 and the metal pipe 4. Therefore, hydrogen bonds are sufficiently formed in the interface between the inner peripheral surface of the fluororubber coating layer 2 and the outer peripheral surface of the metal pipe 4, whereby the fluororubber coating layer 2 firmly adheres to the metal pipe 4.

In the resin hose connection structure, the penetration of the fluorine-containing lubricant of the lubricating layer 3 is promoted by the heat treatment. The heat treatment is typically performed at 100 to 160° C. for 15 to 120 minutes, preferably at 100 to 135° C. for 30 to 120 minutes, particularly preferably at 125 to 135° C. for 30 to 60 minutes. Where the resin hose connection structure of the present invention is to be used in an engine compartment of an automobile, the heat treatment under the aforesaid conditions may be obviated because the connection structure is naturally subjected to heat generated by an engine or the like for passive heat treatment.

Although the metal pipe 4 has two nipples provided in a spaced relation in the end portion thereof in FIGS. 1 and 2, the number of the nipples is not limited to two. The resin hose connection structure of the present invention is applicable to a metal pipe having a single nipple at an end thereof. In this embodiment, the resin hose is of a single layer structure but, of course, may be of a multi-layer structure.

Next, an explanation will be given to Examples and Comparative Examples.

Prior to the explanation of Examples and Comparative Examples, preparation of hoses to be employed in these examples will be explained.

[Preparation of Hose A]

A resin hose of a single layer structure composed of nylon 11 (inner diameter: 6.0 mm, outer diameter: 8.0 mm, thickness: 1.0 mm) was prepared. A fluororubber coating solution having a viscosity of about 100 cps was prepared by dissolving a fluororubber in a solvent, and a fluororubber coating layer (thickness: 30 $\mu$m) was formed entirely on an inner peripheral surface of the resin hose by dipping. A fluorine-containing lubricant of a lower polymer of trifluorochloroethylene (Daifloil) available from Daikin Kogyo K. K. of Osaka, Japan and having a viscosity of 200 mm$^2$/s) was applied in an amount of 2 mg/cm$^2$ on an inner peripheral surface of the fluororubber coating layer in the aforesaid manner with the use of a spindle.

[Preparation of Hose B]

A hose was prepared in substantially the same manner as the hose A, except that a fluorosilicone-based lubricant (FS1265 available from Toray Dow Corning Silicone Co., Ltd. of Tokyo, Japan and having a viscosity of 300 mm$^2$/s) was employed instead of the lower polymer of trifluorochloroethylene for the formation of the lubricating layer.

[Preparation of Hose a]

A hose was prepared in substantially the same manner as the hose A, except that no lubricating layer but only the fluororubber coating layer was formed.

[Preparation of Hose b]

A hose was prepared in substantially the same manner as the hose A, except that no fluororubber coating layer but only the lubricating layer was formed.

[Preparation of Hose c]

A hose was prepared in substantially the same manner as the hose A, except that a dimethyl silicone lubricant (TSF456 available from Toshiba Silicone Co., Ltd. of Tokyo, Japan and having a viscosity of 200 mm$^2$/s) was employed instead of the lower polymer of trifluorochloroethylene for the formation of the lubricating layer.

Examples 1 and 2 and Comparative Examples 1 to 3

The hoses thus prepared were each connected to a metal pipe, and evaluated for the insertion easiness, the sealing property and the withdrawal resistance on the following criteria. The results of the evaluation are shown in Table 1.

[Insertion Easiness]

Figure 3:
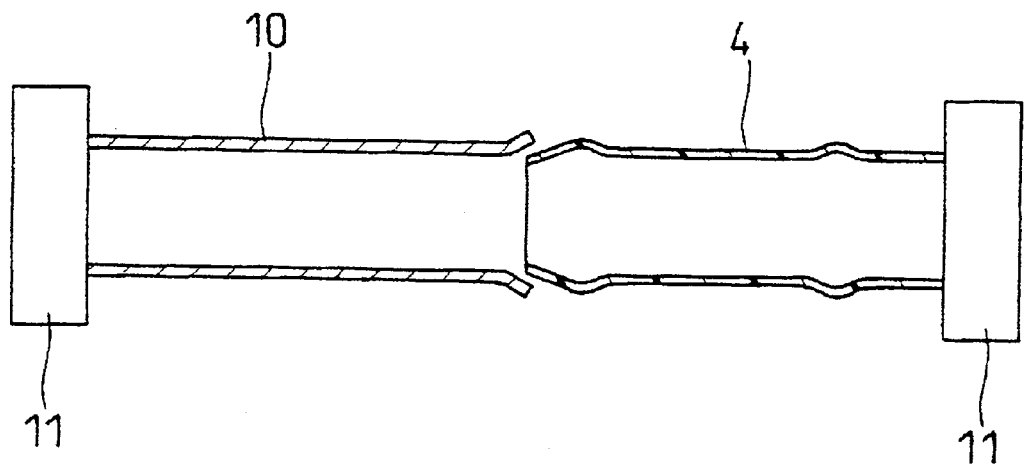
FIG. 3 is a diagram for explaining how to evaluate insertion easiness.

An insertion test was performed as shown in FIG. 3. A metal pipe 4 was prepared, and the hoses were each subjected to a flaring process thereby to have a flared end. The hose 10 was aligned with the metal pipe 4 with the flared end thereof disposed in an overlapped and opposed relation with respect to an end of the metal pipe 4. In this state, the hose 10 was pushed toward the metal pipe 4 at a rate of 150 mm/sec from the other end thereof, whereby the end of the metal pipe 4 was inserted into the flared end of the hose 10. The hose 10 and the metal pipe 4 were respectively fixed by air chucks 11. In Table 1, the results of the evaluation for the insertion easiness are expressed by a symbol ◯ which indicates that the metal pipe was inserted into the hose without any trouble, and a symbol X which indicates that the insertion of the metal pipe into the hose was failed due to deformation of the hose or the like.

[Sealing Property]

Figure 4:
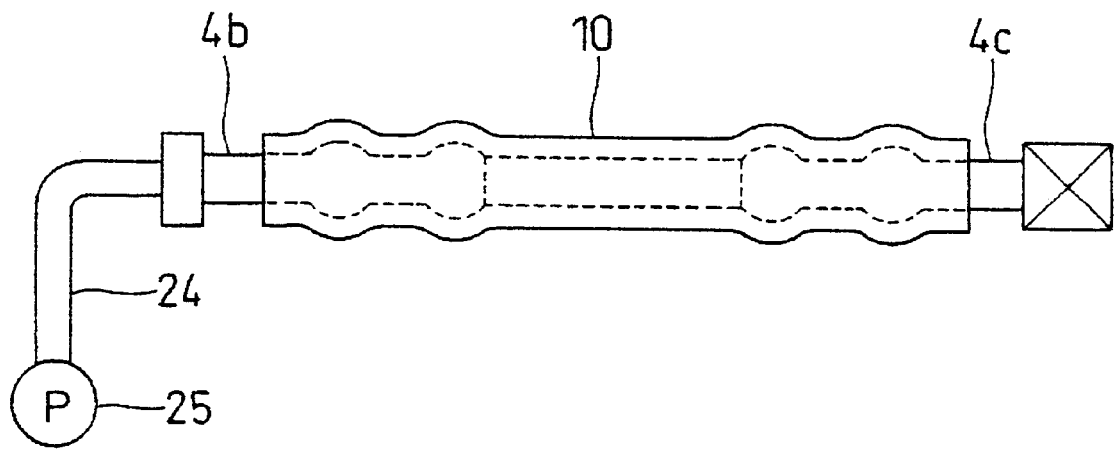
FIG. 4 is a diagram for explaining how to evaluate a sealing property.

The sealing property of each of the hoses was determined as shown in FIG. 4. Metal pipes 4b, 4c were inserted into opposite ends of the hose 10, and fixed thereto. Then, an end of the metal pipe 4c opposite from the hose was closed, and an end of the metal pipe 4d opposite from the hose was connected to a pump 25 via a pipe 24. In this state, the pump 25 was actuated to supply gasoline into the hose 10 via the pipe 24 and the metal pipe 4b under pressure. The pressure was increased stepwise by 0.05 MPa at a time interval of 30 seconds. When the gasoline leaked from at least one of the connections between the hose 10 and the metal pipes 4b, 4c, the pressure (leak pressure) was measured for the evaluation for the sealing property. In Table 1, the results of the evaluation for the sealing property are expressed by a symbol ◯ which indicates that the leak pressure was not lower than 3 MPa, and a symbol X which indicates that the leak pressure was lower than 3 MPa. The evaluation was carried out under three different conditions: (1) for determination of an initial sealing property; (2) for determination of a sealing property after a thermal aging process was performed by heating the hose/pipe assembly at 130° C. for 200 hours; and (3) for determination of a sealing property after four 24-hour thermal shock cycles were performed by repeatedly subjecting the hose/pipe assembly to −30° C. for 7 hours and to 120° C. for 14 hours with a temperature transition period of 1.5 hours.

[Withdrawal Resistance]

A metal pipe was inserted into an end of each of the hoses A, B, a, b, c, and fixed thereto. Then, the resulting hose/pipe assembly was stretched at a rate of 100 mm/min, and a force required for withdrawing the metal pipe from the hose was determined. In Table 1, the results of the evaluation for the withdrawal resistance are expressed by a symbol ◯ which indicates that the withdrawal force was not smaller than 400 N, and a symbol X which indicates that the withdrawal force was smaller than 400 N. The evaluation was carried out under the three conditions described above.

TABLE 1

|  | Example | | Comparative Example | | |
| --- | --- | --- | --- | --- | --- |
|  | 1 | 2 | 1 | 2 | 3 |
| Hose | A | B | a | b | c |
| Insertion easiness | ◯ | ◯ | X | ◯ | ◯ |
| Sealing property |  |  |  |  |  |
| At initial stage | ◯ | ◯ | — | X | X |
| After thermal aging | ◯ | ◯ | — | X | X |
| After thermal shock | ◯ | ◯ | — | X | X |
| Withdrawal resistance |  |  |  |  |  |
| At initial stage | ◯*1 | ◯*1 | — | X*2 | X*2 |
| After thermal aging | ◯*1 | ◯*1 | — | X*2 | X*2 |
| After thermal shock | ◯*1 | ◯*1 | — | X*2 | X*2 |

TABLE 1-continued

|  | Example | | Comparative Example | | |
| --- | --- | --- | --- | --- | --- |
|  | 1 | 2 | 1 | 2 | 3 |
| Hose | A | B | a | b | c |

*1: Hose was broken.
*2: Pipe was withdrawn from hose.

As can be understood from the results shown in Table 1, the hoses of Examples 1 and 2 ensured easy insertion, and were excellent in the sealing property and the withdrawal resistance.

In the case of the hose of Comparative Example 1 which had no lubricating layer, on the other hand, the insertion was particularly difficult. The hose of Comparative Example 2 which had no fluororubber coating layer had a significantly poorer sealing property. In the case of the hose of Comparative Example 3, the fluororubber coating layer and the lubricating layer were provided but the lubricating layer was not formed of the fluorine-containing lubricant and, therefore, the adhesion between the resin hose and the fluororubber coating layer was deteriorated, resulting in a poorer sealing property.

In accordance with the present invention, the fluororubber coating layer is formed on the inner peripheral surface of the resin hose as described above. Therefore, fluorine atoms in the fluororubber molecular skeleton are hydrogen-bonded to hydroxyl groups of a metal of the metal pipe, so that the adhesion between the resin hose and the metal pipe is enhanced for improvement of the sealing property. Further, the lubricating layer formed on the inner peripheral surface of the fluororubber coating layer facilitates the insertion of the metal pipe into the resin hose for the connection therebetween. After the connection, the fluorine-containing lubricant penetrates into the fluororubber coating layer on the inner peripheral surface of the resin hose, so that the lubricating layer disappears. Thus, hydrogen bonds are sufficiently formed in the interface between the metal pipe and the fluororubber coating layer on the inner peripheral surface of the resin hose for further improvement of the sealing property.

Since the resin hose generally has a complicated configuration, precise positioning of the resin hose with respect to the metal pipe has conventionally been required for the connection between the resin hose and the metal pipe. In addition, there has been a fear that the resin hose is angularly displaced from an initial angular position with respect to the metal pipe due to a stress exerted on the hose during use. In accordance with the present invention, however, the fluororubber coating layer having an elastic property is provided on the inner peripheral surface of the resin hose and, therefore, the angular displacement of the hose from the initial angular position can virtually be prevented by a so-called anti-turning effect.

What is claimed is:

1. A method of connecting a resin hose to a metal pipe, the method comprising the steps of:
   providing a resin hose of a least one resin layer;
   applying a fluororubber coating material to an inner peripheral surface of the resin hose so as to form a fluororubber coating layer;
   forming a lubricating layer of a fluorine-containing lubricant on an inner peripheral surface of the fluororubber coating layer;

inserting an end portion of the metal pipe into an end portion of the resin hose formed with the lubricating layer.

2. A method as set forth in claim 1, wherein the fluorine-containing lubricant consists essentially of polyfluorohaloolefin.

3. A method as set forth in claim 2, wherein the polyfluorohaloolefin is trifluorochloroethylene.

4. A method as set forth in claim 2, wherein the polyfluorohaloolefin has a viscosity of 50 to 1000 mm$^2$/s at 25° C.

5. A method as set forth in claim 3, wherein the polyfluorohaloolefin has a viscosity of 50 to 1000 mm$^2$/s at 25° C.

6. A method as set forth in claim 1, wherein the fluorine-containing lubricant consists essentially of a fluorine-modified silicone.

7. A method as set forth in claim 6, wherein the fluorine-modified silicone has a viscosity of 50 to 1000 mm$^2$/s at 25° C.

8. A method as set forth in claim 1, wherein the fluororubber coating layer has a thickness of 1 to 200 μm.

9. A method as set forth in claim 1, further comprising the step of causing the fluorine-containing lubricant to penetrate into the fluororubber coating layer.

10. A method as set forth in claim 9, wherein a heat treatment is performed for the penetration of the fluorine-containing lubricant into the fluororubber coating layer.

11. A resin hose connection structure produced by a resin hose connection method as recited in claim 1.

* * * * *